Nov. 21, 1961 E. UMRATH 3,009,665
CHART DRIVE MECHANISM
Filed Aug. 20, 1957 2 Sheets-Sheet 1

ERNST UMRATH
INVENTOR.

BY Rudolph J. Junick
ATTORNEY

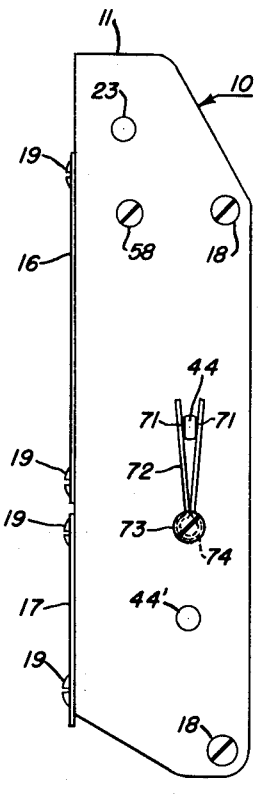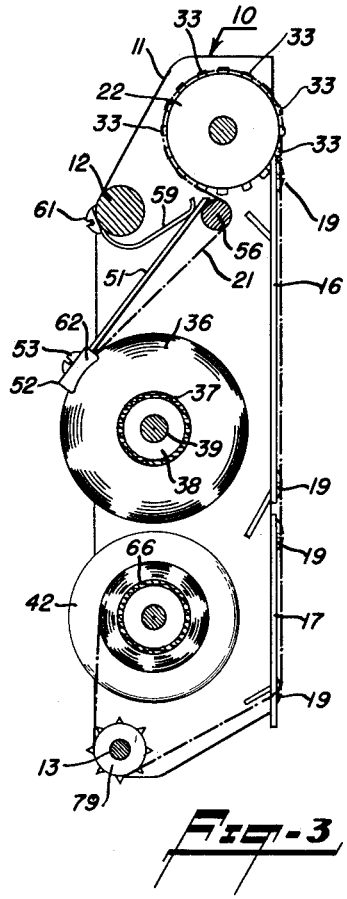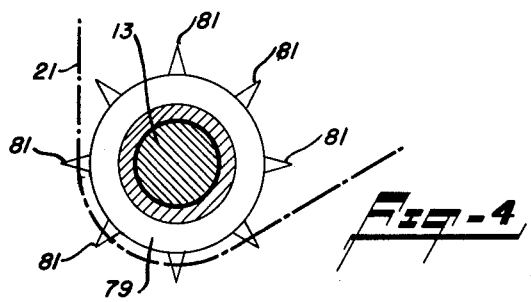

United States Patent Office

3,009,665
Patented Nov. 21, 1961

3,009,665
CHART DRIVE MECHANISM
Ernst Umrath, North Plainfield, N.J., assignor, by mesne assignments, to Daystrom, Incorporated, Murray Hill, N.J., a corporation of New Jersey
Filed Aug. 20, 1957, Ser. No. 679,202
7 Claims. (Cl. 242—57.1)

This invention relates to a recording instrument and more particularly to the chart supply and reroll mechanism thereof.

In recording instruments of the type contemplated by my invention, a record of the value of a condition, or conditions, under measurement is made upon a continuously moving strip chart. A pen, or stylus (or printing characters in the case of multiple recorders), is utilized to make a record of the condition on the chart; the recording element being moved laterally across the chart to a position corresponding to the value of the condition. The chart is generally driven at a constant speed by means of a drive roller having a plurality of radially extending projections, or timing pins, adjacent one edge thereof which project through apertures in the margin of the chart whereby driving engagement between the chart and drive roller is effected. The apertures in the chart are located at a predetermined spaced distance from the right margin thereof, whereby the right margin is fixed against lateral movement with respect to the drive roller when properly engaged by the projections on the roller. The chart is drawn from a suply roll which is mounted upon a cylindrical core, or tube. The supply roll core of many contemporary recording instruments is initially properly aligned with the drive roller wherein the apertures in the chart are engaged by the projections on the drive roll as the supply roll is drawn off the core. Supply rolls, however, are not always evenly wound upon the supply roll core in the manufacture thereof. If the supply roll is unevenly wound, wherein the edge thereof is concave, convex, undulating, or otherwise uneven, the resulting lateral displacement of the perforations in the chart as the chart is drawn therefrom will often result in mistrackage. One important feature of my invention is the provision of a novel supply roll mounting device which allows the supply roll core to move laterally, in response to uneven windings thereon whereby the right margin of the chart paper leaving the supply roll is always at a predetermined position with relation to the drive roll. In this manner, chart trackage failure due to unevenly wound supply rolls is eliminated.

The chart which is drawn off the supply roll core, and driven over the drive roller, is wound upon a reroll tube or cylinder. The chart roller and reroll tube are both driven by a chart drive motor; the chart roller being directly coupled to the motor through suitable gearing for constant speed rotation thereof, and the reroll tube being connected through a friction drive mechanism which tends to rotate at a faster rate than the chart roller. In this manner, a predetermined reroll pull, or tension, is applied to the chart as it leaves the drive roller. For proper chart trackage, a suitable drag must be applied to the supply roll, the amount of which is related to the reroll pull, or tension. A single, proper, adjustment of the supply roll drag in contemporary instruments, however, for all chart rolls, is virtually impossible since different chart supply rolls unwind with varying degrees of ease. For example, some chart rolls unroll freely, while others tend to unroll in a sticking manner wherein adjacent turns of the chart have a definite affinity for each other. Another important feature of my invention includes means for alternately advancing and applying a drag to the supply roll, thereby providing corrective measures for the prevention of chart trackage failures which would otherwise result from the use of supply rolls which either unroll too easily, or with great difficulty.

Due to normal, inherent, chart paper variations, and minor mechanical misalignments, lateral displacement and slippage of the chart as it is wound upon the reroll tube are common defects found in the reroll mechanism of contemporary recording instruments. These effects are transmitted to the feed, or drive, mechanism and often result in trackage failure. Further, as the reroll is building up, diameter differences along the reroll, due to inherent paper variations, and the like, are unavoidable, and result in an uneven reroll tension, or pull, on the chart. If variations of this nature are not compensated for, they will gradually build up and cause reroll and trackage failure. Another important feature of my invention, then, is the provision of a novel mechanism over which the chart passes in its travel from the drive roll to the reroll tube, which mechanism prevents uneven pulls on the chart at the reroll from being transmitted through the chart to the drive roller. The same mechanism also prevents lateral displacement of the chart. Thus, with my novel chart drive mechanism, all of the common causes of chart trackage failure are eliminated and, as a result, chart speeds are attainable, which far surpass the maximum chart speeds possible with chart drive mechanisms used in present day recording instruments.

An object of this invention is the provision of a chart drive mechanism for recording instruments which prevents chart trackage failure regardless of inherent variations in chart rolls, and variations between different chart rolls.

An object of this invention is the provision of a chart drive mechanism in which chart trackage is maintained regardless of minor mechanical misalignments in the mechanism.

An object of this invention is the provision of a mounting arrangement for a supply tube having a strip chart wound thereon, which arrangement includes means rotatably supporting the said tube, means biasing the said tube in one axial direction, and means engaging the edge of the outer chart turns to limit the axial movement produced by the said biasing means and so to accurately fix the margin of the chart being removed from the tube against lateral movement.

An object of this invention is the provision of a supply roll mounting arrangement for use in a recording instrument, the said arrangement including a supply roll shaft rotatably mounted on the said instrument, means operatively connecting the said supply roll to the supply roll shaft for rotation thereon, means forming a generally flat portion on the said supply roll shaft, and resiliently biased means engaging the said shaft adjacent the said flat portion thereon to alternately advance and retard the rotation thereof.

An object of this invention is the provision of a chart drive mechanism for use in a recording instrument, the said mechanism including a drive roller, a reroll tube, a rod member having pointed teeth members extending therefrom adjacent the opposite ends thereof, a chart in driving engagement with the said drive roller and extending past the said rod member to the said reroll tube, the said teeth members on the said rod piercing the said chart adjacent the chart margins, the said chart riding on the said teeth members intermediate the pointed ends thereof and the rod upon which the said teeth are mounted.

These and other objects and advantages will become apparent from the following description when taken with the accompanying drawings. It will be understood, however, that the drawings are for purposes of illustration and are not to be construed as defining the scope or limits of the invention, reference being had for the latter purposes to the appended claims.

In the drawings wherein like reference characters denote like parts in the several views:

FIGURE 2 is a side elevational view of the mechanism;

FIGURE 3 is a vertical sectional view taken approximately on line 3—3 of FIGURE 1; and FIGURE 4 is an enlarged fragmentary view taken on line 4—4 of FIGURE 1 and including a portion of a chart therein.

Figure 1:
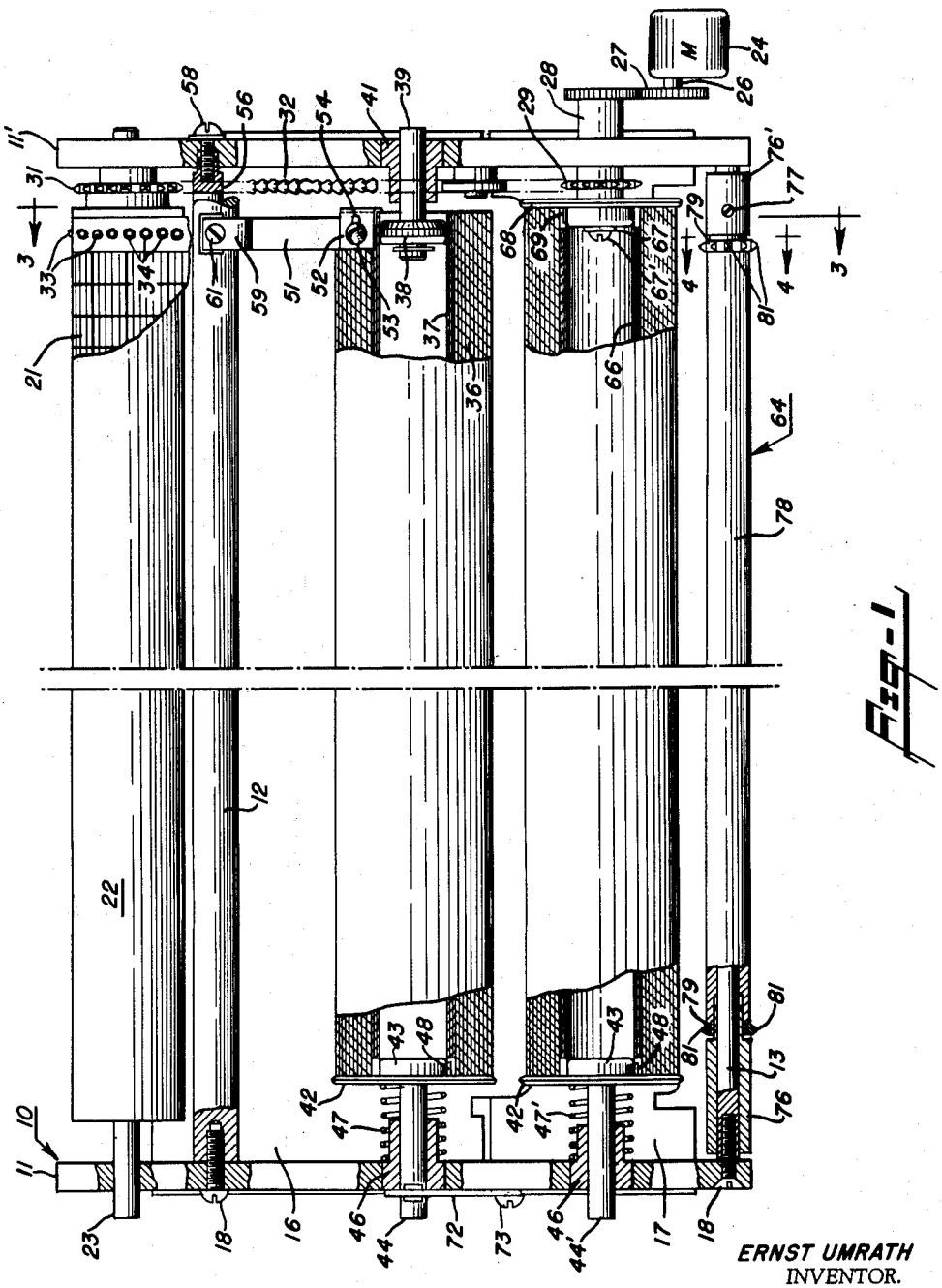
FIGURE 1 is a rear elevational view, with parts in section and parts broken away for clarity, of my novel chart drive mechanism.

Reference is now made to FIGURES 1 through 3 of the drawings wherein there is shown a chart frame, designated generally by reference numeral 10, which frame includes a pair of vertical end plate members 11 and 11'. The end plate members are maintained in parallel relation a predetermined spaced distance apart by use of rod members 12 and 13, and front plate members 16 and 17; the rod members being secured to the end plates by means of screws 18 which extend through the end plates and into threaded holes in the rod members along the axis thereof, and the front plates being secured to the edges of the end plates by screws 19 extending through the front plates and into threaded apertures in the edge of the end plates.

A chart 21, upon which a record of the value of the condition, or conditions, is to be made, is advanced by a drive roller, or drum 22, which is carried upon a shaft 23; the shaft being rotatably supported in suitable bearings (not shown) in the end plates 11 and 11'. The chart is graduated lengthwise in units of time and in the transverse direction in units of the condition being measured, such as temperature, pressure, weight, and the like. The drive roller, or drum, 22 is driven at a constant speed by means of a synchronous motor 24, seen in FIGURE 1. The motor shaft 26 is coupled through a gear train 27 to a reroll drive shaft 28. Sprocket wheels 29 and 31 are integrally formed on the reroll and drive roller shafts 28 and 23, respectively, and are connected by means of a chain linkage 32. The sprocket wheel 29 is of a somewhat smaller diameter than the wheel 31 whereby the shaft 28 is driven at a slightly greater rate than the shaft 23 and attached drive roller 22.

The chart drive roller, or drum, 22 is provided adjacent one end with projections, or timing pins, 33 which extend through apertures, or perforations 34 in the margin of the chart thereby providing a driving engagement between the chart and drive drum. The chart 21 is unwound from a chart supply roll 36 which is wound upon a cylindrical-shaped supply core, or tube, 37. The mounting of the supply tube 37 and roll 36 between the end plates 11, 11' forms an important part of my invention, the mounting for the supply tube and roll being such that the chart is drawn from the roll in a manner wherein the apertures 34 are in substantially lateral alignment with the timing pins, or projections, 33 on the drive drum 22 at all times.

As viewed in FIGURE 1, the right side of the supply tube 37 is mounted upon a bearing member 38 which is suitably secured to a shaft 39. The shaft 39 is rotatably mounted in a bearing 41 in the end plate 11' and is prevented from axial movement therewithin by any suitable means. The inside diameter of the supply tube 37 is slightly greater than the diameter of the bearing 38 whereby free axial (or lateral) movement between the bearing and tube is permitted. At the other end of the supply tube, a disc member 42 having an axially extending hub 43 formed thereon is supported upon a shaft 44, which shaft is rotatably mounted in a bearing 46 in the end plate 11. The shaft 44 is axially movable within the bearing 46, and the shaft and attached disc 42 are biased to the right, as viewed in FIGURE 1, by means of a coil spring 47 positioned between the disc and end plate 11. The tube 37 is keyed to the disc 42 by means of a key 48 which extends radially of the hub 43 into a notch formed in the end of the tube.

Lateral movement of the tube 37 with the supply roll 36 wound thereon, by the spring 47, is limited by a guide arm 51 and guide tab 52 which is attached to the guide arm by means of a screw 53 extending through an elongated hole 54 in the guide tab and into threaded engagement with a tapped hole in the guide arm adjacent the free end thereof. The guide arm 51 is secured to a shaft 56 as by welding, or any other suitable means. The shaft, in turn, is rotatably mounted between the end plates 11 and 11' in such a manner as to permit limited lateral positioning within their bearings by proper adjustment of friction type screws 58. A leaf spring 59 is secured to the supporting rod 12 by means of a screw 61 and lightly biases the guide arm 51 in a counterclock-wise direction, as viewed in FIGURE 3, and into engagement with the supply roll 36. The guide tab 52 is of an L-shaped form, being bent at an angle of 90 degrees, or at an angle somewhat greater than 90 degrees. The short-length leg of the tab 52, which is designated 62, engages the edge of one, or the edges of only a few, of the external layers, or turns, of the chart being held in proper position by the light engagement of the longer leg of said tab 52 with a circumferential edge portion only of the roll 36. Being a mere feeling or positioning engagement, it has no appreciable effect on the tension of the chart leaving the roll.

In the production of the chart, or supply rolls, the perforations, or apertures 34 in the margin of the chart 21 are formed a predetermined spaced distance from the edge thereof, which distance is held to close manufacturing tolerances. The inner surface of the leg 62 on the tab 52, which is adapted to abut the chart roll edge, is therefore adjusted, or preset, to the above-mentioned predetermined spaced distance laterally of the timing pins, or projections, 33 on the drive drum. The spring 47 provides a constant axial biasing force on the supply roll to maintain engagement between the edge of the outer turn, or turns, of the roll and tab, while the leaf spring 59 biases the tab into engagement with the surface of the outer turn of the chart. Thus, it will be seen, that as the chart is drawn off the supply roll, the perforations 34 therein are continuously maintained in substantially perfect alignment, laterally, with the timing pins 33 on the drive drum. Even unevenly wound chart supply rolls, having ends which are not flat, but which are concave, convex, or of an undulating contour, will leave the supply roll in alignment with the timing pins. The adverse effects resulting from unevenly wound chart supply rolls, which effects include mistrackage over the drive drum, are eliminated by the use of my novel supply roll mounting.

From the drive drum 22, the chart 21 is drawn over the face plates 16 and 17, as best seen in FIGURE 3, and from thence passes over a reroll guide member, designated generally by reference numeral 64, and is wound upon a reroll tube, or cylinder, 66. As mentioned above, the reroll tube is driven by the motor 24, through the shaft 28. The sprocket or wheel 29, on the shaft 28, is smaller than the sprocket wheel 31 formed on the drive drum shaft 23 whereby the shaft 28 rotates at a greater rate than the drive drum, or roller 22. A friction clutch 67, of any suitable design, connects the shaft 28 to a disc member 68. Preferably, a friction clutch which is adjustable is utilized whereby the coupling torque thereof may be set for any desired amount. To this end I provide a screw driver adjustment member 67' extending axially therefrom.

The reroll tube 66 is keyed to the disc 68 by a key 69 formed on the disc and engaging a notch in the end of the reroll tube. The disc 68, and keyed reroll tube 66, tend to reroll the chart which is driven over the drive drum, at a faster rate than the drive drum draws the chart from the supply roll. This tendency, in conjunction with the reroll friction clutch 67, which is continuously in sliding friction engagement, produces a predetermined reroll tension, or pull upon the chart leaving the drive drum. The disc 68 is fixed laterally by any suitable means not shown.

The construction of the mounting for the left end of the reroll tube 66, as viewed in FIGURE 1, is substantially identical to that of the mounting for the left end of the supply tube 37 directly above. The configuration of the free end of the mounting shaft for the reroll tube, however, differs from that of the supply tube shaft 44 and is, therefore, designated 44'. Also, the spring for biasing the reroll tube 48 laterally may be much stronger than the light spring 47 for biasing the supply roll against the tab 52 and is, therefore, designated 47'. It will be understood that the reroll tube mounting, including the friction clutch drive mechanism, may be of any conventional design, the mounting shown being for purposes of illustration only.

A common characteristic of chart supply rolls, which varies greatly between rolls, is the affinity, or lack thereof, which exists between adjacent turns of the roll. It is common to find that one chart roll unrolls freely with very little pull thereon, while another requires a constant pull of considerably greater magnitude. The force required to unwind a chart roll (which is hereinafter referred to as the "inherent drag" of the roll) is ordinarily a factor which would be adjusted, or compensated, for in the chart drive mechanism. For proper chart trackage, including the proper alignment of the chart apertures with the timing pins, or projections, on the drive drum, the total supply drag (i.e., the force which tends to inhibit rotation of the supply roll) is a predetermined percentage, or ratio, of the reroll tension or pull (i.e., the force tending to rewind the chart upon the reroll tube 66). Obviously, if different chart supply rolls tend to unwind with varying degrees of ease, the total supply roll drag will likewise differ between supply rolls. By means of a simple mechanism for alternately providing a supply roll advancement and drag, my novel chart drive mechanism is adapted to accommodate, without adjustments, chart supply rolls which exhibit any degree of inherent drag within wide ranges existing in presently manufactured chart rolls.

Reference is now made specifically to FIGURES 1 and 2 wherein a novel supply roll advance and drag mechanism is shown whereby all types of chart rolls, regardless of inherent drag variations, may be used. The supply roll shaft 44 is formed at the outer end thereof, with a pair of oppositely disposed flats, designated 71. A generally U-shaped spring 72 having normally parallel extending arm or leg members, which are shown in a spread-apart position and straddling the supply roll shaft end, is fastened to the end plate 11 by means of a screw 73, the screw extending through a loop 74 formed in the lower end of the spring. As the chart 21 is drawn off the supply roll by rotation of the drive drum, the spring 72 performs two diametrically opposed functions every one-half revolution of the shaft 44. First, when the flats 71 of the shaft are generally parallel to the spring legs, as shown, a heavy drag is applied thereto, which drag is maintained until the spring shaft has rotated to a position wherein the spring legs engage the round, or curved, portion of the shaft, where the drag is, obviously, greatly reduced. Secondly, at the instant the shaft rotates further to a position wherein the spring legs pass from the round portion to the flat portions of the shaft, the shaft, and attached supply roll, is momentarily subjected to a driving impulse and advanced by approximately ¼ revolution, due to the spring biasing action. Thus, it will be seen that twice every revolution of the shaft 44, the supply roll is alternately provided with a heavy drag and momentarily advanced. The first-mentioned function results in a corrective action for a chart roll which tends to unroll too freely, while the second function produces a corrective action for a chart roll having a large inherent drag.

The final important feature of my chart drive mechanism resides in the reroll guide member 64 over which the chart passes in its travel between the drive drum 22 and the reroll tube 66. Reference is again made to FIGURE 1 wherein the cylindrical-shaped reroll guide member 64 is shown rotatably mounted upon the rod member 13 extending between the end plates 11 and 11'. Cylindrical spacer members 76, 76' are secured to the rod member 13 adjacent the ends of the guide member by set screws 77; the spacer members serving to properly laterally position the guide member 64 on the rod 13. The guide member 64 comprises a cylindrical-shaped member 78 having star wheels 79 attached to the ends thereof, as by welding, or any other suitable means. As best seen in FIGURE 4, which is an enlarged sectional view taken on line 4—4 of FIGURE 1, the star wheels 79 are provided with a plurality of pointed teeth members 81 radially extending from the periphery of the wheels. The spacer members 76, 76' slidably engage the sides of the star wheels 79 so as to prevent lateral movement of the guide member. The star wheels are adapted to engage the chart adjacent the margins thereof, preferably outside of the effective range of the instrument.

The nominal reroll pull is adjusted (by adjustment of the friction clutch 67) to the point wherein the tapering teeth members 81 on the star wheels penetrate the chart. The adjustment is such, however, that the chart is never pulled down to the base of the pointed teeth members. The chart always "floats" at some point on the slope of the teeth members, as seen in FIGURE 4, depending upon the actual momentary reroll pull. As the chart is being wound upon the reroll tube 66, diameter differences laterally across the chart, due to inherent chart variations, mechanical misalignment, and the like, are unavoidable. The diameter differences of the reroll produce an uneven pull which, without my novel reroll guide member 64, is transmitted to the drive drum. If variations of this nature are not compensated for, or corrected substantially immediately, they will build up and eventually cause reroll and trackage failure. With the use of my novel reroll guide member, however, such reroll and trackage failure through uneven reroll pull is avoided. If, for example, the reroll pull, or tension, is greater adjacent one edge of the chart than the other, the increased pull merely pulls the chart further down the slope of the teeth members 81, and the tension variation is immediately absorbed by the "variable diameter effect" of the star wheels. The pull, or tension, between the guide member 64 and the drive drum 22, therefore, remains constant at both sides of the chart despite variations in pull across the chart between the reroll tube and guide member. Thus, the drive drum 22 is isolated from the uneven tension effects at the reroll tube by means of the star wheels. In addition, oscillatory weaving effects on the reroll which are commonly experienced in winding wide ribbons of chart paper upon a tube are eliminated by the use of my novel star wheel guide member.

A secondary effect of the star wheels, which is also of importance, is to lock the chart against lateral displacement. Drift and slippage, due to normal inherent variables of the chart and minor mechanical misalignments of the mechanism, are thus prevented. The star wheels act as guide members for the chart between the drive drum and reroll.

It will be understood, then, that with my novel supply and reroll mechanism, chart trackage failures for all types of charts, regardless of inherent variations, are eliminated. Also, poor trackage due to mechanical misalignment of the mechanism is greatly reduced. Further, the maximum speed at which the chart may be driven is greatly increased; the maximum chart speeds on contemporary instruments being about 2 inches/second while chart speeds of over 30 inches/second are easily attainable by the use of my novel mechanism.

Having now described my invention in detail in accordance with the patent statutes, various changes and modi-

I claim:

1. In a recording instrument, or like device, a strip chart having a series of spaced apertures adjacent the margin thereof, a drive drum having a plurality of radially extending projections thereon for drivingly engaging the said apertures in the strip chart, a take-up drum upon which the chart from the driving drum is wound, means rotating the said take-up roll to provide a pull on the said chart, a pair of interconnected star wheels having a plurality of radially extending pointed teeth thereon, means rotatably mounting the said interconnected star wheels, the said chart extending from the said drive drum to the said take-up roll over the said star wheels, the said teeth on the star wheels perforating the said chart adjacent the edges thereof, the said chart normally engaging the perforating teeth intermediate the pointed end and bottom thereof.

2. In a recording instrument, or the like, having a supply roll with a strip chart, or the like, wound thereon, means rotatably supporting the said roll, a drive drum drivingly engaging the said chart and unwinding the chart from the supply roll, means periodically advancing the rotation of the said supply roll at a rate greater than the rate of unwinding produced by the said drive drum.

3. In a recording instrument, or the like, having a supply roll with a strip chart, or the like, wound thereon, means rotatably supporting the said roll, a drive drum drivingly engaging the said chart and unwinding the chart from the supply roll, and means during a first predetermined part only of each revolution supplying a frictional drag to the said chart roll inhibiting the rotary movement thereof, the said last-mentioned means advancing the rotation of the said supply roll at a rate greater than the rate of unwinding produced by the said drive drum during a second predetermined part only of each revolution.

4. In a recording instrument, or the like, having a supply roll with a strip chart, or the like, wound thereon, means rotatably supporting the said roll, a drive drum drivingly engaging the said chart and unwinding the same from the supply roll, and means automatically during each revolution alternately increasing and decreasing the normal supply roll rate of rotation.

5. In a mounting for a supply roll having a strip chart, or the like, wound thereon, means rotatably supporting one end of the supply roll, a rotatable shaft supporting the other end of the supply roll, means forming a non-cylindrical portion on the said shaft, and biasing means engaging the said non-cylindrical portion producing variable degrees of drag thereon alternating with driving impulses during rotation of the shaft.

6. In a mounting for a supply roll having a strip chart, or the like, wound thereon, means rotatably supporting one end of the said roll, a rotatable shaft supporting the other end of the roll, means forming a pair of oppositely-disposed flats on the said shaft, and a generally U-shaped spring having a pair of generally parallel legs straddling the said shaft at the flats formed thereon and frictionally engaging the shaft.

7. In a recording instrument, or like device, a supply roll with a strip chart having a series of spaced apertures adjacent the margin thereof wound thereon, means rotatably and axially movably supporting the said supply roll, a generally L-shaped tab member movable in a generally radial direction of the said supply roll and fixed axially thereof, one leg of the said tab member engaging the outer turn of the chart supply roll at the face thereof and the other leg of the tab member normally engaging the edge of several outer turns thereof, means biasing the said tab member in a generally radial direction into engagement with the chart supply roll, means axially biasing the said chart supply roll into engagement with the said tab member, a drive drum having a plurality of radially extending projections thereon for drivingly engaging the said apertures in the strip chart and unwinding the said chart from the said supply roll at a predetermined rate, means alternately increasing and decreasing the said predetermined rate of supply roll unwinding at the said supply roll, a take-up drum upon which the chart from the driving drum is wound, means rotating the said take-up roll to provide a pull on the said chart, and a pair of interconnected star wheels having a plurality of radially extending pointed teeth thereon, the said chart extending from the said driving drum to the said take-up roll over the said star wheels, the teeth on the said star wheels pnetrating the said chart adjacent the edges thereof.

References Cited in the file of this patent

UNITED STATES PATENTS

| | | |
|---|---|---|
| 568,515 | Buckingham et al. | Sept. 29, 1896 |
| 847,977 | Ballard | Mar. 19, 1907 |
| 980,997 | Pierpont | Jan. 10, 1911 |
| 1,039,212 | Sullivan | Sept. 24, 1912 |
| 1,158,767 | Amrhein | Nov. 2, 1915 |
| 1,213,771 | Leen et al. | Jan. 23, 1917 |
| 1,980,463 | Wright | Nov. 13, 1934 |
| 1,987,141 | Casper | Jan. 8, 1935 |
| 2,010,908 | Wood | Aug. 13, 1935 |
| 2,037,086 | Nash | Apr. 14, 1936 |
| 2,556,812 | Jordan | June 12, 1951 |
| 2,575,421 | Lanegan | Nov. 20, 1951 |

FOREIGN PATENTS

| | | |
|---|---|---|
| 155,380 | Great Britain | Dec. 20, 1920 |